UNITED STATES PATENT OFFICE.

EINAR BERGVE AND JON SUNDBY, OF CHRISTIANIA, NORWAY, ASSIGNORS TO NORSK HYDRO-ELEKTRISK KVAELSTOFAKTIESELSKAB, OF CHRISTIANIA, NORWAY.

TREATMENT OF NITRATE OF AMMONIA.

1,263,363.   Specification of Letters Patent.   Patented Apr. 23, 1918.

No Drawing.   Application filed May 8, 1917. Serial No. 167,352.

*To all whom it may concern:*

Be it known that we, EINAR BERGVE and JON SUNDBY, both subjects of the King of Norway, residing at Christiania, Norway, have invented certain new and useful Improvements in the Treatment of Nitrate of Ammonia; and we do hereby declare the following to be a full, clear, and exact description of the invention, such as will enable others skilled in the art to which it appertains to make and use the same.

This invention relates to the manufacture of nitrate of ammonia and has for its object a process of converting this substance into a granular form.

Owing to its high content of nitrogen nitrate of ammonia is a very suitable fertilizer, which could be sent long distances without incurring too high freight costs. It is connected however with the drawback of caking together on being stored forming a hard mass which can be removed from the packings only by the use of special means and which must be then treated in grinding apparatus in order to be converted into such a finely divided condition as to allow of its being spread by hand or by means of spreading machines. The farmers, however, are usually not in possession of such grinding means and the possibility of introducing the nitrate of ammonia as a fertilizer in agriculture will therefore depend upon whether means can be found allowing of storing and conveying the product without causing changes in its state of division. Owing to the very great importance of a practical solution of this problem many experiments have been made to improve the product by means of mixing the solid nitrate of ammonia with various finely pulverized substances for the purpose of providing the single granules with a thin layer, so that the granules don't come into direct contact with one another and preventing thereby the granules from caking together. A quite satisfactory result has however not been attained by these means. Also other experiments which have been made to reduce the hydroscopic character of the nitrate of ammonia by means of strongly drying the same, have not led to the desired result.

We have now invented a process of treating nitrate of ammonia by means of which the hydroscopic character of the same and its liability of caking together is completely eliminated. From the experiments referred to above by means of which an attempt was made to prevent the contact between the single crystals by the addition of pulverized substances, the present process differs therein that it is a process of agglomeration, its object consisting in uniting a large number of crystals into granules or lumps. The additions used then serve—partly at least—only as an adhesive. According to the present invention a moist mixture of nitrate of ammonia and an inorganic substance which, when mixed with water produce a liquid of a viscous consistency, is first prepared, and this moist mixture is then dried and heated, while maintaining the mixture in motion by suitable stirring or agitating means.

The temperature employed during the heating operation should be from 90° to 110° centigrade, and not above 130°, or the vaporizing temperature of the moisture, but in most instances a temperature of about 90° will be sufficient. It is also of advantage to subject the mixture to a preliminary drying operation at temperatures between 20° and 40° centigrade before heating to said higher temperature. The process which is below further described with reference to a specific example is then based upon the observation made by us that when pulverized nitrate of ammonia is mixed with substances of the nature above specified and the moist mixture is dried while being maintained agitated, a granular product is obtained in that the original small crystals are bound together by means of the substances added, and larger granules are formed. The character of the granules as regards their hydroscopicity, compactness, etc., can be further improved by the addition of small quantities of certain substances, such as plaster of Paris to the nitrate of ammonia previously to the treatment referred to. As an example of an inorganic substance of the character above referred to, may be mentioned hydroxid of iron, for instance in the form of morass ore, (bog ore iron). Another substance suitable for the purpose is, for example silica, for instance in the form of kieselguhr.

The moist mixture of the substances referred to may be produced by moistening a dry mixture of the substances in question with water, or with a solution of a salt, or by adding a solution or suspension of one of the components to the other substance in the form of a dry powder. It will be seen from the above that the process may be modified in different ways obvious to anybody skilled in the art, and which it is not necessary to describe.

In the following an embodiment of the process is described, by way of example, in which morass ore is used as the substance to be applied in a suspended condition.

The nitrate of ammonia is crushed and is, while being kept in motion supplied with a suspension of for instance 3% of morass ore in 7% of water (based on the quantity of nitrate of ammonia). When the mass has been sufficiently well mixed, it is dried a couple of hours at 22—30° centigrade. When the content of water has been reduced to about 5%, the mass begins to form granules, the morass ore acting as an adhesive. From this stage of the process the mass must be subjected to a cautious mechanical treatment or stirred in order to prevent the granules from becoming too large. The temperature is then raised the finishing drying operation being effected at about 90° centigrade. A short subsequent treatment of the dried product in vacuum has been found to be of advantage. The weight of a certain volume of the product can be increased by means of increasing the viscosity of the morass ore suspension by additions such as kieselguhr, gelatinized starch, salts of ammonia, salts of potassium etc. A higher density and an improvement in the properties of the granules is also obtained by the addition of various substances to the nitrate of ammonia previously to the granulating operation. Thus small quantities such as 3% of plaster of Paris has been found to be a very suitable addition. If burned plaster of Paris is used this is hydrated off before the mass is heated and treated.

We claim:

1. Process of treating ammonium nitrate, comprising the steps of subjecting a moist mixture of nitrate of ammonia and such inorganic substances which with water produce liquids of a viscous consistency, to drying and heating at temperatures below 130° C. and agitating the mixture during said heating operation.

2. Process of treating ammonium nitrate, comprising the steps of subjecting a moist mixture of nitrate of ammonia and an inorganic substance which with water produces a liquid of a viscous consistency, to a preliminary drying operation at a comparatively low temperature, and finally drying and heating the mixture at temperatures between 90° and 110° C., while maintaining the mixture agitated.

3. Process of treating ammonium nitrate, comprising the steps of subjecting a moist mixture of nitrate of ammonia and an inorganic substance, which with water produces a liquid of a viscous consistency, to a preliminary drying operation at a temperature of between 20° and 40° centigrade, and finally drying and heating the mixture at a temperature between 90° and 110° while maintaining the mixture agitated.

4. Process of treating ammonium nitrate, consisting in moistening solid nitrate of ammonia with a liquid containing an inorganic substance which with water produces a viscous liquid and then drying and heating the mixture while maintaining the same agitated.

5. The process of treating ammonium nitrate, comprising the steps of preparing a moist mixture of nitrate of ammonia and morass ore, drying and heating the mass at temperatures between 90° and 110° centigrade, and agitating the mixture during said heating operation.

6. Process of treating ammonium nitrate, consisting in mixing nitrate of ammonia with plaster of Paris, moistening the mixture with a liquid containing inorganic substances which with water produces a viscous liquid, and subjecting the mixture to drying and heating at a temperature between 90° and 110° centigrade, while maintaining the mixture agitated.

In testimony that we claim the foregoing as our invention we have signed our names in presence of two subscribing witnesses.

EINAR BERGVE.
JON SUNDBY.

Witnesses:
KARL L. LEE,
C. NORMAN.